United States Patent
Hicks et al.

(10) Patent No.: US 12,488,234 B2
(45) Date of Patent: Dec. 2, 2025

(54) REINFORCEMENT LEARNING FOR TESTING SUITE GENERATION

(71) Applicant: International Business Machines Corporation, Armonk, NY (US)

(72) Inventors: Andrew C.M. Hicks, Wappingers Falls, NY (US); Deborah A. Furman, Staatsburg, NY (US); Michael Terrence Cohoon, Fishkill, NY (US); Michael E Gildein, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 17/121,796

(22) Filed: Dec. 15, 2020

(65) Prior Publication Data

US 2022/0188627 A1 Jun. 16, 2022

(51) Int. Cl.
*G06N 3/08* (2023.01)
*G06F 18/20* (2023.01)
(Continued)

(52) U.S. Cl.
CPC ............ *G06N 3/08* (2013.01); *G06F 18/217* (2023.01); *G06F 18/285* (2023.01); *G06N 3/045* (2023.01); *G06N 3/063* (2013.01)

(58) Field of Classification Search
CPC .......... G06N 3/08; G06N 3/045; G06N 3/063; G06N 3/082; G06N 3/084; G06N 3/086; G06F 18/217; G06F 18/285
See application file for complete search history.

(56) References Cited

U.S. PATENT DOCUMENTS

| | | | |
|---|---|---|---|
| 5,708,774 A | 1/1998 | Boden | |
| 9,977,729 B1 * | 5/2018 | Ivancic | .............. G06F 11/3612 |

(Continued)

FOREIGN PATENT DOCUMENTS

| | | |
|---|---|---|
| CN | 108446214 A | 1/2018 |
| CN | 110321291 A | 10/2019 |

(Continued)

OTHER PUBLICATIONS

Kumar et al. ("BiPhase adaptive learning-based neural network model for cloud datacenter workload forecasting", Soft Computing ( 2020) pp. 14593-14610) (Year: 2020).*

(Continued)

*Primary Examiner* — Imad Kassim
(74) *Attorney, Agent, or Firm* — CANTOR COLBURN LLP; Teddi Maranzano

(57) ABSTRACT

Aspects of the invention include mutating each neural network of a portion of a first array of neural networks, wherein each neural network of the first array of neural networks is configured to select a respective sequence of test cases for testing a computing infrastructure. Causing each neural network of a second array of neural networks to select a respective sequence of test cases for testing the computing infrastructure. Generating a child neural network by performing a crossover operation between a mutated neural network of the portion of the first array and a neural network of the second array of neural networks, the child neural network generating a new sequence of test cases for testing the computing infrastructure.

17 Claims, 6 Drawing Sheets

(51) Int. Cl.
  *G06F 18/21* (2023.01)
  *G06N 3/045* (2023.01)
  *G06N 3/063* (2023.01)

(56) References Cited

U.S. PATENT DOCUMENTS

| | | | |
|---|---|---|---|
| 10,908,599 | B2 | 2/2021 | Naito |
| 11,080,603 | B2* | 8/2021 | Odena ................ G06N 3/10 |
| 12,050,979 | B2* | 7/2024 | Singh ................ G06N 3/08 |
| 2008/0082968 | A1 | 4/2008 | Change et al. |
| 2010/0153785 | A1 | 6/2010 | Keromytis et al. |
| 2010/0262559 | A1* | 10/2010 | Wilcock ........... G06Q 10/067 705/348 |
| 2018/0260714 | A1 | 9/2018 | Li et al. |
| 2019/0122119 | A1* | 4/2019 | Husain ............. G06N 3/086 |
| 2019/0318806 | A1* | 10/2019 | Wise ................ G06N 3/048 |
| 2020/0073788 | A1 | 3/2020 | Saha et al. |
| 2021/0019628 | A1* | 1/2021 | Yao ................ G06N 5/01 |
| 2021/0390376 | A1* | 12/2021 | Byrne ............. G06N 3/045 |
| 2022/0292357 | A1* | 9/2022 | Xu ................ G06N 3/08 |

FOREIGN PATENT DOCUMENTS

| | | |
|---|---|---|
| CN | 110377511 A | 10/2019 |
| CN | 111242281 A | 6/2020 |
| CN | 111897733 A | 11/2020 |
| CN | 116670692 A | 8/2023 |
| DE | 112021006508 T5 | 11/2023 |
| EP | 3422261 A1 | 1/2019 |
| GB | 2617737 A | 10/2023 |
| JP | H11-154145 A | 6/1999 |
| JP | 2003-508835 A | 3/2003 |
| JP | 2019-082882 A | 5/2019 |
| JP | 2019-101961 A | 6/2019 |
| JP | 2019-516148 A | 6/2019 |
| JP | 2023-552552 A | 12/2023 |
| WO | 2001/016881 A2 | 3/2001 |
| WO | WO-2021234365 A1 * | 11/2021 ........... G06N 3/0454 |
| WO | 2022/127393 A1 | 6/2022 |

OTHER PUBLICATIONS

Desell et al. ("Large Scale Evolution of Convolutional Neural Networks Using Volunteer Computing", Mar. 15, 2017) (Year: 2017).*
Esfahanian et al. ("GACNN: Training Deep Convolutional Neural Networks With Genetic Algorithm", Sep. 29, 2019) (Year: 2019).*
Vargas et al. ("Spectrum-Diverse Neuroevolution with Unified Neural Models", IEEE Transactions on Neural Networks and Learning Systems, Jan. 6, 2019) (Year: 2019).*
Lu et al. ("NSGA-Net: Neural Architecture Search using Multi-Objective Genetic Algorithm", GECCO'19, Jul. 13-17, 2019) (Year: 2019).*
Ma et al. ("DeepMutation: Mutation Testing of Deep Learning Systems", 2018 IEEE 29th International Symposium on Software Reliability Engineering) (Year: 2018).*
International Search Report and Written Opinion for Internation Application No. PCT/CN2021/126862; International Filing date: Oct. 28, 2021; Date of Mailing: Jan. 25, 2022; 9 pages.
Japan Patent Office, "Notice of Reasons for Refusal" Jan. 29, 2025, 8 Pages, JP Application No. 2023-534078.

* cited by examiner

REINFORCEMENT LEARNING FOR TESTING SUITE GENERATION

BACKGROUND

The present invention generally relates to programmable computing systems, and more specifically, to programmable computing systems configured to incorporate reinforcement learning for testing suite generation.

Test engineers perform computing system testing to verify the functionality of the system's hardware and software. In general, test engineers subject computing systems to testing protocols to verify whether the system's components function properly under some technical or functional specification. Test engineers learn the system's expected capabilities and limitations from hardware and software specifications. Based on the specifications, the test engineers design system specific test cases to result in target signal responses. Based on the actual received signal responses, the test engineers determine whether the system performs within the boundaries of the expected capabilities and limitations.

SUMMARY

Embodiments of the present invention are directed to reinforcement learning on a safe code. A non-limiting example computer-implemented method includes mutating each neural network of a portion of a first array of neural networks, wherein each neural network of the first array of neural networks is configured to select a respective sequence of test cases for testing a computing infrastructure. Causing each neural network of a second array of neural networks to select a respective sequence of test cases for testing the computing infrastructure. Generating a child neural network by performing a crossover operation between a mutated neural network of the portion of the first array and a neural network of the second array of neural networks, the child neural network generating a new sequence of test cases for testing the computing infrastructure.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
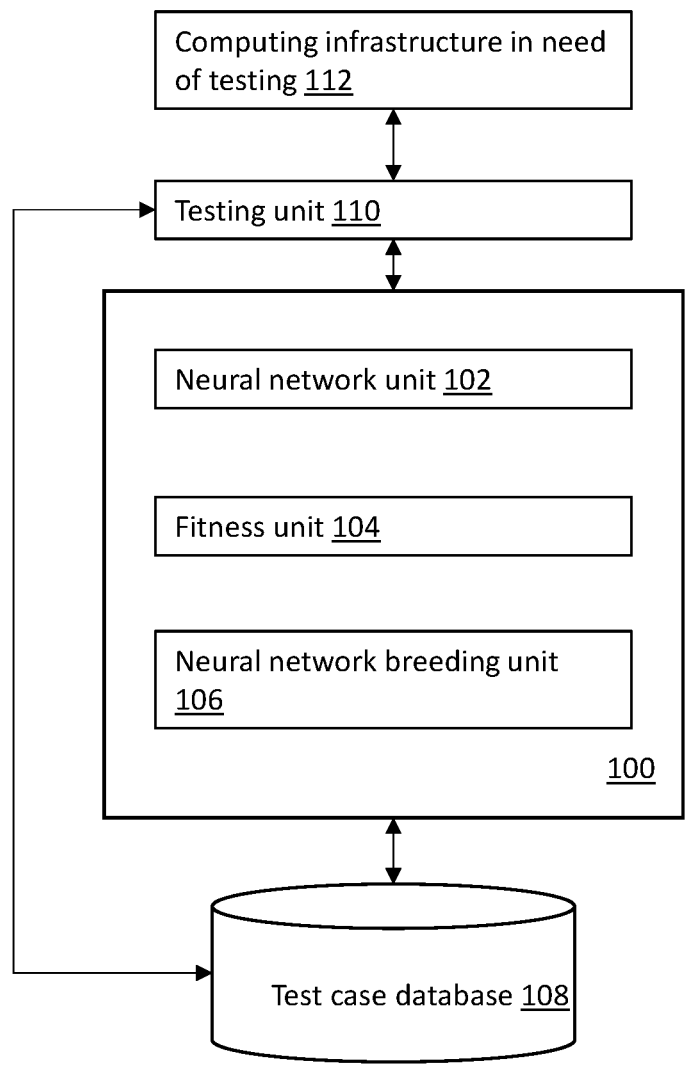
FIG. 1 illustrates a block diagram of components of a system for neural network generation for testing in accordance with one or more embodiments of the present invention.

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products that generate a neural network designed to select an optimal sequence of test cases for testing a computer infrastructure.

Test engineers develop test cases to test different aspects of a computing system. Each test case is a set of variables or conditions used to test an aspect of the computing system. The test cases drive different functions of the computing system and cause the system to generate a signal response. The engineers then group different test cases together into test suites. Each test suite includes a sequence of test cases designed to test a particular aspect of the computing system. The engineers run the test suite against the computing system and analyze the signal responses. Unfortunately, the engineers must exhaust time and resources to develop the test cases and test suites. Furthermore, an engineer's judgment can be clouded by habits or lack of understanding of a test case or a computing system. This can lead to a poor sequence of the test cases that do not adequately verify the computing system.

One or more embodiments of the present invention address one or more of the above-described shortcomings by providing computer-implemented methods, computing systems, and computer program products that combine mutated neural networks to create a new neural network that determines an optimal test suite. A first array of neural networks is introduced and analyzed to determine which of the neural networks generate the best choice of test cases for a test suite. Each neural network of the first array is from the same class of neural networks. The best neural networks from the first array are mutated using a genetic algorithm. The mutated neural networks are analyzed to determine which of the mutated neural networks generate the best choice of test cases for a test suite. A second array of neural networks is introduced and analyzed to determine which of the neural networks generate the best choice of test cases for the test suite. The neural networks from the second array are from a different class of neural networks than the first array. The top performing mutated neural networks and neural networks from the second array are combined using the genetic algorithm to form a new neural network for generating the best choice of a test cases for the test suite.

Turning now to FIG. 1, a system 100 for generating a test suite is generally shown in accordance with one or more embodiments of the present invention. The system 100 includes a neural network unit 102 for managing an array of neural networks used to determine test cases for testing a computing infrastructure in need of testing 112. The system 100 further includes a fitness unit 104 for assessing a fitness of each neural network. The system 100 further includes a neural network breeding unit 106 for breeding new arrays of neural networks based on the fitness assessments of the fitness unit 104. The system 100 is further in operable communication with a test case database 108, which includes test cases for static or dynamic testing. The system 100 is further in operable communication with a testing unit 110 that performs the testing of the computing infrastructure in need of testing 112. It should be appreciated that the system 100 can be implemented via the processing system 600 described in FIG. 6.

The neural network unit 102 manages iterations of neural network arrays. Each array of neural network includes neural networks from a same class. For example, each neural network can be a feedforward neural network with an identical number of nodes, inputs layers, hidden layers, and output layers. In other iterations, the class of the first array includes a radial bias network (RBN), a long/short term memory (LSTM) network, a deep convolutional network (DCN), or other appropriate network. The different classes of neural networks differ in their topology as to the functioning of the node layers and the connections between nodes.

The neural network unit 102 initializes each neural network of the first array to select a sequence of test cases. Initialization includes randomization of the weights and biases associated with each neural network. Each neural network of the first array receives, as inputs, features of each test case included in the test case database 108. Each neural network of the first array also receives as inputs testing parameters for a particular aspect of the computing infrastructure in need of testing 112. The computing infrastructure in need of testing 112 includes all physical and virtual resources used to process, analyze, and store data. Each neural network applies the inputs to a model, which in turn outputs a sequence of test cases for a test suite to test the computing infrastructure in need of testing 112.

In accordance with one more embodiment of the present invention, each neural network is made up of a set of interconnected nodes (neurons). Each connection between a first neuron and a second neuron is associated with a weight, which signifies the strength of a relationship between two connected neurons. Each neuron is associated with an activation function that determines the output of the neuron. Each activation function is associated with a bias, which is a constant value. An output value of a first neuron is modified by the weight and transmitted to the second neuron. The second neuron receives the value and uses it as an input for its associated activation function. The second neuron solves the activation function, adds the bias, and outputs a value to a subsequent layer of neurons. As the weights and biases of each neural network have been randomized, each neural network is operable to predict a different set of test cases to form a test suite.

The fitness unit 104 applies the fitness function to each neural network to evaluate whether the neural network has predicted the optimum solution of sequences of testing cases to test the computing infrastructure in need of testing 112. The fitness unit 104 is operable to apply a respective fitness function for each feature, capabilities, limitation, or function of the computing infrastructure in need of testing 112. The fitness unit 104 takes the sequence of test cases predicted by a neural network and applies the sequence as an input into the fitness function. The fitness function further receives the signal response to the sequence from the computing infrastructure in need of testing 112. Based on the sequence and the signal response, the fitness function produces an output fitness score as to how "fit" the sequence is towards testing the particular feature, capability, limitation, or function. For example, the testing unit 110 tests if two or more hardware components of the computing infrastructure in need of testing 112 are mismatched. As mismatched components often result in processing bottlenecks, the fitness function is used to compare the sequence in relation to a number of contention related events generated by the sequence. The fitness function score is based in part on how close the actual number of contention related event occurred in comparison to a predicted threshold number.

The fitness unit 104 selects the highest performing neural networks from the first array. The fitness unit 104 uses various criteria for determining the highest performing neural networks. In some embodiments of the present invention, the fitness unit 104 selects the highest threshold percentile of neural networks. For example, the fitness unit 104 selects the neural networks whose fitness score is in the ninetieth percentile or higher. In other embodiments of the present invention, the fitness unit 104 selects a threshold number of neural networks with the highest score. For example, the fitness unit 104 selects the thirty neural networks with the thirty highest scores. In response to the selection by the fitness unit 104, the neural network unit 102 removes the balance of the neural networks from the first array of neural networks.

The neural network breeding unit 106 receives the neural networks selected by the fitness unit 104 and mutates the neural networks by using a genetic algorithm. The neural network breeding unit 106 uses the genetic algorithm to change the weights, biases associated with each neural network, as well as a topology of the neural network. The genetic algorithm is used to train the neural network in lieu of using a cost/objective function and modification through backpropagation. In some embodiments of the present invention, the weights and biases are changed by pairing two of the selected neural networks and swapping one or more of the weights and one or more of the biases. In other embodiments of the present invention, the neural network breeding unit 106 changes the weights and biases randomly. The neural network breeding unit 106 changes the topology by adding or subtracting nodes from the neural network. To add a node, the neural network breeding unit 106 disables a connection between two nodes. The neural network breeding unit 106 then adds a new node in between the two disabled nodes. The neural network breeding unit 106 then adds connections between the new node and the two disabled nodes. The neural network breeding unit 106 can also disable an existing connection between two connected nodes or add and connect a node to another node.

In some embodiments of the present invention, the neural network breeding unit 106 considers each neural network architecture to have a genotype and a network phenotype. The genotype includes a node genes set and a connected genes set. The node genes set includes entries for each node, where each entry includes an identifier for each node, and a description of whether the node is an input node(sensor), hidden node, or output node. The connected genes set includes an entry for each set of connected nodes. The connections include direct connections and indirect connections. Each entry includes the identity of the two connected nodes, a weight value between the nodes, an indication of whether the connection is enabled or disabled, and a unique innovation number identifying the connection. The innovation numbers create an index of each evolutionary change of the neural network. For example, suppose a neural network includes input node one connected to hidden layer node two, which is connected to output node three. The node genes set would include three entries for the three nodes. The connected genes set would include three entries for the direct connection between node one and two, the direct connection between nodes two and three, and the indirect connection between nodes one and three. An indirect connection is a form of a disabled connection. The network phenotype describes all of the relations between the three nodes, for example, as a directed graph.

As a further illustration, the above described neural network can include a fourth input layer node connected to the third node but no other node. In accordance with one or more embodiments of the present invention, the neural network breeding unit 106 can connect the fourth node to the third node. The neural network breeding unit 106 then adds an entry to the connected node set and assigns the new entry a unique innovation number. The neural network breeding unit 106 also updates the network phenotype to reflect the additional connection. In another instance, the neural network breeding unit 106 can connect a new node between two disabled nodes. The neural network breeding unit 106 then appends the connected gene set to reflect the direct and indirect connections along with unique innovation numbers. Using the same illustration as above, the neural network breeding unit 106 disables the connection between node one and node two. The neural network breeding unit 106 then connects a new node five between nodes one and two. The neural network breeding unit 106 then appends the connected gene set to reflect the connection between nodes one and five, and the connection between nodes five and two along with the unique innovation numbers. The unique innovation numbers are used during a crossover process between two neural networks. The neural network breeding unit 106 continues to mutate selected neural networks in this fashion until a threshold number of mutated neural networks is generated. In some embodiments of the present invention, the threshold number of mutated neural networks is the same number of neural networks as the first array of neural networks.

In accordance with one or more embodiments of the present invention, the neural network unit 102 initializes each mutated neural network. Each mutated neural network receives, as inputs, features of each test case included in the test case database 108. Each mutated neural network also receives, as inputs, testing parameters for a particular aspect of the computing infrastructure in need of testing 112. Each mutated neural network uses the features as inputs for a model, which outputs a sequence of test cases for a test suite to test the aspect of the computing infrastructure in need of testing 112. The fitness unit 104 applies the fitness function to each mutated neural network to evaluate whether the mutated neural network has predicted the optimum solution of sequences of testing cases. The fitness unit 104 then selects the highest performing mutated neural networks.

The neural network unit 102 initializes each neural network of a second array of neural networks. Each neural network of the second array is a different class of neural networks than the first array. For example, if the first array was composed of feed-forward neural networks, then the second array is composed of radial bias networks. Therefore, although the first array and mutated neural networks are a same species of neural networks because they originated from the same class, the second array is from a different class, and is therefore a different species. In some embodiments of the present invention, the second array includes the same number of neural networks as the first array. Each neural network of the second array receives as inputs features of each test case included in the test case database 108. Each neural network of the second array also receives as inputs the testing parameters for a particular aspect of the computing infrastructure in need of testing 112. Each neural network applies the inputs to a model, which outputs a sequence of test cases for a test suite to test the aspect of the computing infrastructure in need of testing 112. The fitness unit 104 applies the fitness function to each neural network of the second array to evaluate whether the mutated neural network has predicted the optimum solution of sequences of testing cases to test the computing infrastructure in need of testing 112. The fitness unit 104 then selects the highest performing neural networks from the second array.

The neural network breeding unit 106 performs a crossover function to breed a new neural network by combining the highest performing neural networks from the mutated neural networks and second array of neural networks. The crossover function takes a parent neural network from the mutated neural networks and a parent neural network of second array to breed a child neural network. The neural network breeding unit 106 compares the fitness score of the two neural networks. Through backpropagation, the neural network breeding unit 106 determines which sequence of connected nodes of the higher scoring neural network led to prediction of the sequence of test suites. The neural network breeding unit 106 also determines which sequence of connected nodes of the lower scoring neural network led to the prediction of the sequence of test suites. The connections that form the sequences are the connections described by the connected gene set and identified by the unique innovation number. The neural network breeding unit 106 then adds the sequence of connected nodes of the higher and lower scoring neural networks to the child neural network. This process is completed when each neural network is a parent to a child neural network.

Figure 2A:
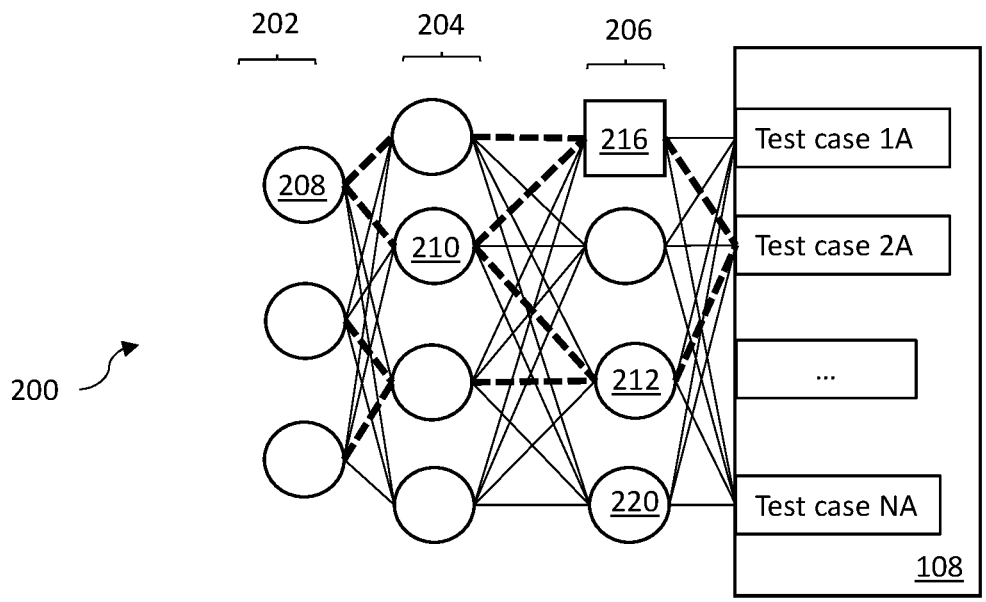
FIG. 2A illustrates a neural network in accordance with one or more embodiments of the present invention.
Figure 2B:
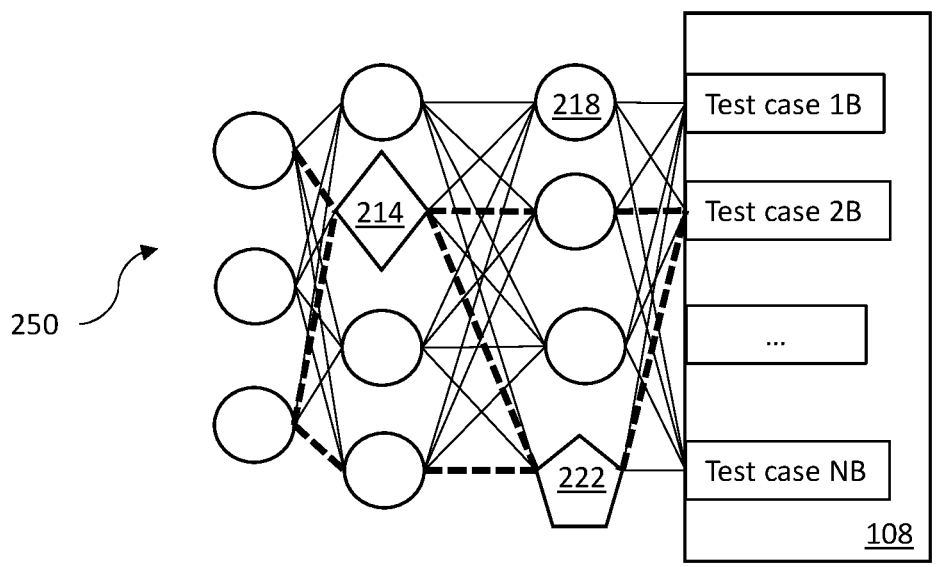
FIG. 2B illustrates a mutated neural network in accordance with one or more embodiments of the present invention.

In some embodiments of the present invention, the neural network breeding unit 106 performs a crossover function on two disjoint neural networks having different topologies. In these instances, a first neural network and a second neural network may include different numbers of layers or nodes. For example, the first neural network may have three hidden layers, whereas the second neural network may have four hidden layers. The first neural network can also have nodes that are connected differently than the second neural network. For example, the first neural network has an input node (e.g., a sensor) connected to two nodes of a four node hidden layer, whereas the second neural network has an input node (e.g., a sensor) connected to four nodes of a four node hidden layer. In this situation, the neural network breeding unit 106 generates duplicate nodes to allows for a one to one mapping of the first neural network to the second neural network based on a factor of paths in the neural network. The neural network breeding unit 106 can identify the core nodes along a path (sequence of connected nodes) that most contribute to the text case selection. For example, FIGS. 2A and 2B illustrates paths through dashed lines, and the core nodes are the nodes connected by the dashed line paths. The neural network breeding unit 106 can use various methods to identify the core nodes. In some embodiments of the present invention, the neural network breeding unit 106 can identify the core nodes based on backpropagation algorithm. The neural network breeding unit 106 can then multiply the core nodes of the first neural network with the core nodes of the second neural network to form two neural networks. The two neural networks can be referred to a first prime neural network and a second prime neural network. The number of nodes of the first neural network and the second neural network are respectively factor values. The additional nodes added to the first neural network and the second neural network to form the first prime neural network and the second prime neural network are the duplicate nodes. The neural network breeding unit 106 then breeds a respective child neural network from the first prime neural network and the second prime neural network, through identifying common (same) nodes and introducing randomization to uncommon (different) nodes. Each child neural network is reduced by a factor of their respective parent neural networks.

Together the child neural networks form a third array of neural networks. Each child neural network of the third array is initialized by the neural network unit 102 to make a prediction as to a sequence of test cases to form a test suite. The fitness unit 104 applies the fitness function to each child neural network to evaluate whether the child neural network has predicted the optimum solution of sequences of testing cases to test the computing infrastructure in need of testing 112. The fitness unit 104 then selects the highest performing child neural networks.

This process can be repeated, in which new arrays of different classes of neural networks are introduced until a termination condition is condition. The new arrays of neural networks are evaluated using the fitness function. The highest performing neural networks are selected and combined with the highest performing neural networks of a prior array. In some embodiments of the present invention, the termination condition is that the neural networks have attained aa average threshold fitness score. In other embodiments of the present invention, the termination function is a recognition of diminishing returns of further mutation and crossover. In these instances, the termination is based on an average increase of fitness scores of one array to a subsequent array being less than a threshold increase value. For example, if an average fitness score of a fifth array is x and an average fitness score of a sixth array is y, and y-x is less than a threshold increase value z, the termination condition has been reached.

The test case database 108 includes a plurality of test cases. Each test case is a set of variables or conditions used for a unit test, a function test, a system test, or an integration test. For example, if the system 100 is generating a test suite for testing memory leakage at a server, the testing case includes an initialization of a memory intensive video game. In other instances, the system 100 can generates other test suites for other aspects, such as memory utilization or input/output throughput. Each test case is a component of a test suite, that includes a sequence of test cases that are used to test the computing infrastructure in need of testing 112. Each test case further includes criteria to determine whether the computing infrastructure in need of testing 112 passed or failed. For example, as to memory leakage the criteria dictates that misallocation of hundred bytes of is normal and therefore passing, whereas a misallocation of a megabyte of data constitutes a failure. As used herein, a sequence does not necessarily indicate a temporal sequence of test cases, rather a particular combination of test cases. In some embodiments, the sequence does include a temporal order of test cases that are applied to the computing infrastructure in need of testing 112. In other embodiments, the sequence includes a particular set of test cases that are applied to the computing infrastructure in need of testing 112.

The phrases "neural network" and "machine learning" broadly describes a function of electronic systems that learn from data. A machine learning system, engine, or module can include a machine learning algorithm that can be trained, such as in an external cloud environment (e.g., the cloud computing environment 50), to learn functional relations between inputs and outputs that are currently unknown. In one or more embodiments, machine learning functionality can be implemented using a neural network, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The neural networks can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the neural networks that carry electronic messages between simulated neurons are provided with numeric weights that correspond to the strength or weakness of a given connection. During training, The weights can be adjusted and tuned based on experience, making the neural networks adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Referring to FIG. 2A, an illustration of a first neural network 200 according to embodiments of the present invention is shown. The first neural network 200 includes an input layer 202 with three nodes, a hidden layer 204 with four nodes, and an output layer 206 with four nodes. As illustrated, nodes are connected by dashed lines to show which nodes contributed the most towards the selected test case included in a test suite. For example, input node 208, hidden layer node 210, and output layer node 212 contributed the most to selecting test case 2. The neural network is in communication with a test case database 108. In some embodiments of the present invention, once the first neural network 200 makes a prediction as to the sequence of test cases, it annotates each selected test case in the test case database 108 to reflect the selection.

Referring to FIG. 2B, a second neural network 250 according to embodiments of the present invention is shown. The first neural network 200 has been mutated to generate the second neural network 250. As illustrated, hidden layer node 210 has been mutated to hidden layer node 214, output layer node 216 has been mutated to output layer node 218, and output layer node 220 has been mutated to output layer node 222. In some embodiments of the present invention, the three nodes 210 216 218 from the first neural network 200 are mutated by changing the activation function associated with each node. In other embodiments of the present invention, the three nodes 210 216 218 from the first neural network 200 are mutated by changing the bias value associated with each node. In yet other embodiments of the present invention, the three nodes 210 216 218 from the first neural network 200 are mutated by changing the activation function and the bias value associated with each node.

Figure 3:
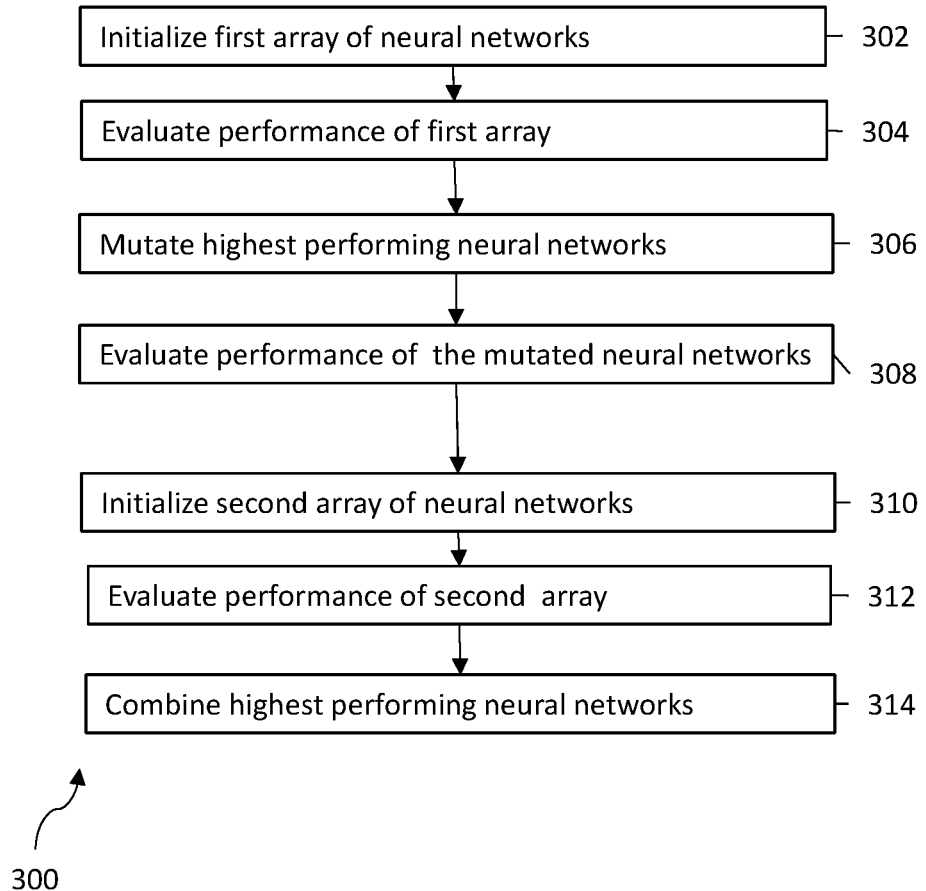
FIG. 3 illustrates a flow diagram of a process for generation of a neural network for testing in accordance with one or more embodiments of the present invention.

Referring to FIG. 3, a flow diagram 300 of a process for generation of a neural network for testing in accordance with one or more embodiments of the present invention is shown. It should be appreciated that all or a portion of the processing shown in FIG. 3 can be performed by a computer system, such as system 100 of FIG. 1. At block 302, a neural network unit 102 initializes a first array of neural networks. Initialization includes randomization of the values of the weights and biases of each neural network. Each neural network of the first array of neural networks is a same class of neural network. For example, each neural network is a feed forward neural network. The neural network unit 102 causes each neural network to receive test cases as inputs and output a sequence of test cases to form a test suite in relation to an aspect of a computing infrastructure in need of testing 112. Each test suite is transmitted to a testing unit 110, which uses the test cases to test an aspect of the computing infrastructure in need of testing 112.

At block 304, a fitness unit 104 evaluates a performance of each neural network of the first array. The fitness unit 104 receives a respective signal response from the computing infrastructure in need of testing 112 for each test suite. Each neural network has selected a sequence of test cases, and therefore each neural network is associated with a respective signal response. The fitness unit 104 applies a fitness function to determine how close the selected test cases of the test suite are to an optimal solution. The fitness unit 104 compares a score produced by the fitness function to a threshold score. The fitness unit 104 evaluates the performance of each neural network based on a distance of the neural network's fitness score to the threshold score. The fitness unit 104 further select a highest performing portion of neural networks of the first array. In some embodiments, the selection is based on the neural networks attaining a fitness score greater than a threshold percentile. In other embodiments, the selection is based on the neural networks having a fitness score greater than a threshold fitness score.

At block 306, the neural network breeding unit 106 uses a genetic algorithm and mutates the highest performing portion of the first array. The neural network breeding unit 106 performs the mutation through various modifications. One option is to modify the weights and biases associated with various nodes or node connections. Another option is to disable connections between nodes, or to add one or more nodes to the neural network. Another option is for the neural network breeding unit 106 to change the activation function associated with a node. For example, the neural network breeding unit 106 changes a linear activation function to a non-linear activation function. Once the neural network breeding unit 106 has completed generating the mutated neural networks, the neural network unit 102 causes each neural network to receive test case features as inputs and output a sequence of test cases to form a test suite in relation to an aspect of a computing infrastructure in need of testing 112.

At block 308, the fitness unit 104 evaluates a performance of each mutated neural network. The fitness unit 104 receives a respective signal response from the computing infrastructure in need of testing 112 for each test suite. The fitness unit 104 evaluates the performance of each mutated neural network using the fitness function. Similarly, the fitness unit 104 calculates a fitness score for each mutated neural network Using the fitness scores, the fitness unit 104 selects a highest performing portion of mutated neural networks.

At block 310, the neural network unit 102 initializes a second array of neural networks. The second array of neural networks is a different class of neural networks than the first array of neural networks. The neural network unit 102 causes each neural network of the second array to receive test case features as inputs and output a sequence of test cases to form a test suite in relation to an aspect of a computing infrastructure in need of testing 112. Each test suite is transmitted to the testing unit 110 to perform a test on the computing infrastructure in need of testing 112.

At block 312, the fitness unit 104 evaluates a performance of each neural network of the second array. The fitness unit 104 receives a respective signal response from the computing infrastructure in need of testing 112 for each test suite. The fitness unit 308 evaluates the performance of each neural network of the second array using the fitness function. Similarly, the fitness unit 104 calculates a fitness score for each neural network of the third array. Using the fitness scores, the fitness unit 104 selects a highest performing portion of neural networks of the second array.

At block 314, neural network breeding unit 106 performs a crossover between a highest performing mutated neural network and a highest performing neural network of the second array. The crossover is performed by combining the highest performing nodes of the mutated neural network with the highest performing nodes of neural network of the second array. The process is repeated until each of the highest performing mutated neural networks is paired with another highest performing neural network of the second array. The child neural networks that are created by the crossover embody best characteristics of each of the arrays.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
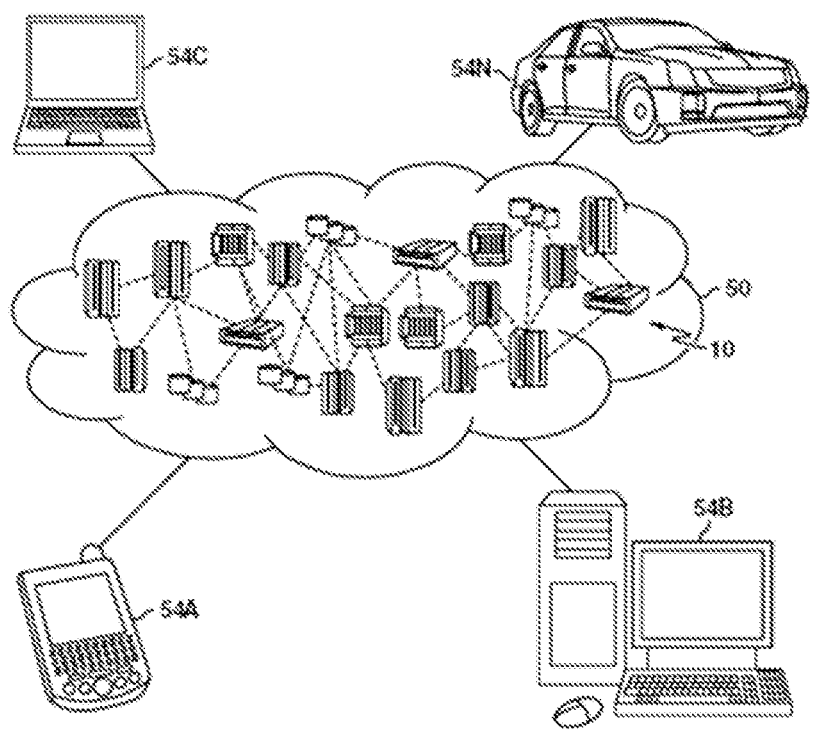
FIG. 4 illustrates a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
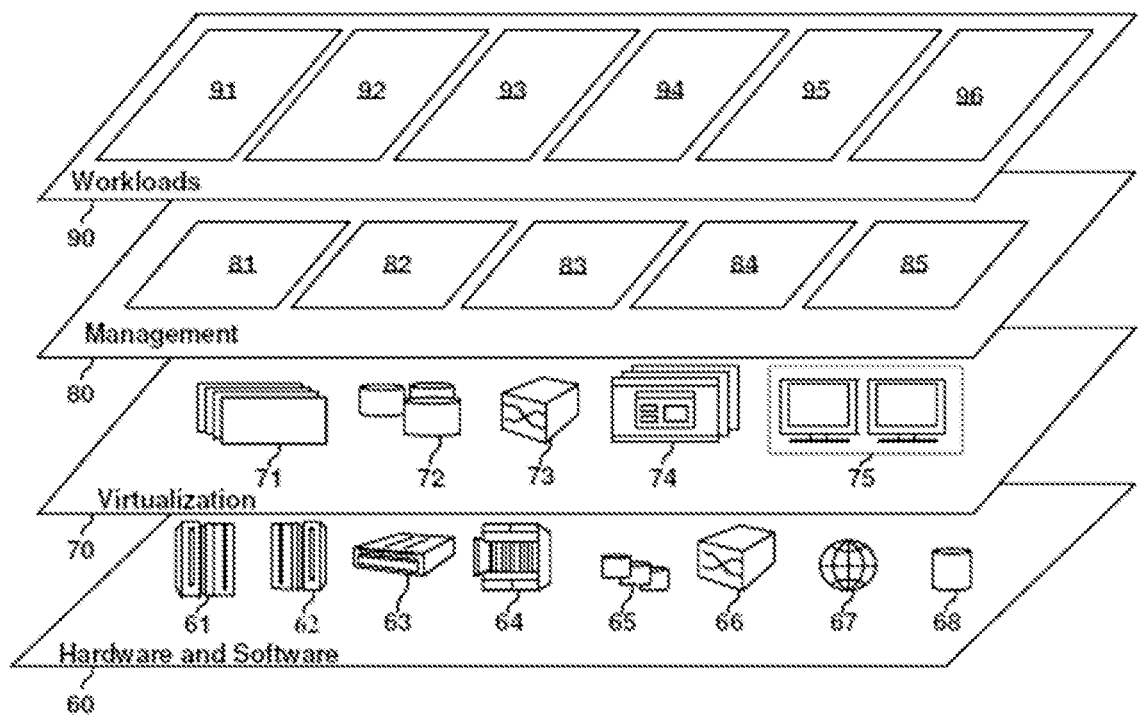
FIG. 5 illustrates abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and generating neural networks for testing case sequence selection 96.

Figure 6:
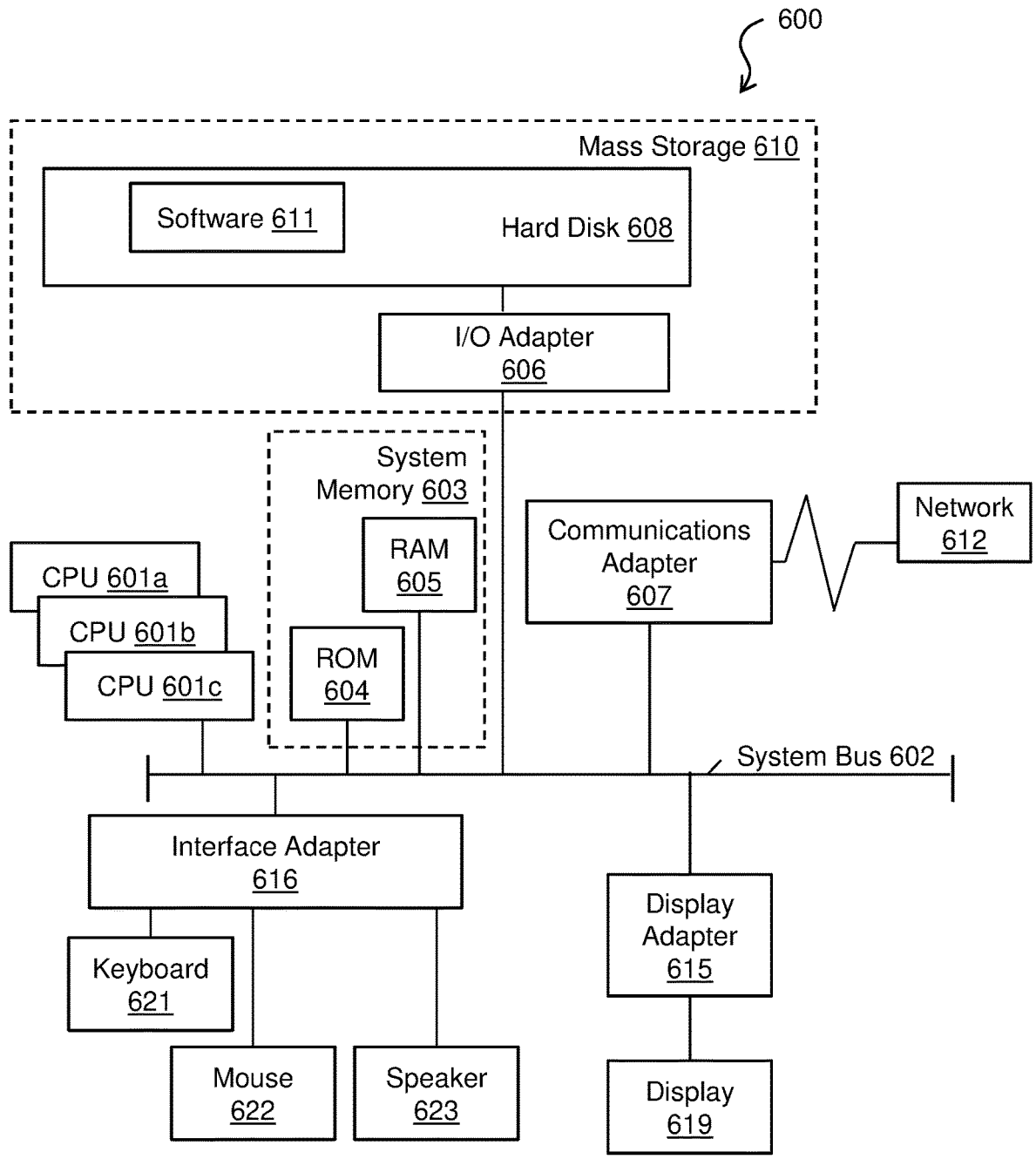
FIG. 6 illustrates a block diagram of a computer system for use in implementing one or more embodiments of the present invention.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 508 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising: mutating, by a processor, each neural network of a portion of a first array of neural networks, wherein each neural network of the first array of neural networks is configured to select a respective sequence of test cases for testing a computing infrastructure, wherein unique innovation numbers are used to track changes to each neural network of the portion of the first array of neural networks resulting from the mutating; causing, by the processor, each neural network of a second array of neural networks to select a respective sequence of test cases for testing the computing infrastructure; and generating, by the processor, a child neural network by performing a crossover operation between a mutated neural network of the portion of the first array of neural networks and a neural network of the second array of neural networks using the unique innovation numbers associated with the mutated neural network of the portion of the first array of neural networks, the child neural network generating a new sequence of test cases for testing the computing infrastructure, wherein each neural network of the first array of neural networks belongs to a first class of neural network having a first neural network architecture type and each neural network of the second array belongs to a second class of neural network having a second neural network architecture type, and wherein the second neural network architecture type differs in topology from the first neural network architecture type as to the functioning of node layers and connections between nodes of the neural networks, and wherein the first neural network architecture type is of a first type selected from a group consisting of a feedforward neural network, a radial bias network, a long/short term memory network, and a deep convolutional network, and wherein the second neural network architecture is of a second type selected from a group consisting of a feedforward neural network, a radial bias network, a long/short term memory network, and a deep convolutional network, that differs from the first type.

2. The computer-implemented method of claim 1 further comprising initializing each neural network of the first array of neutral networks by randomizing a portion of respective weights and biases associated with each neural network of the first array of neural networks.

3. The computer-implemented method of claim 1 further comprising:
calculating a respective fitness score for each neural network of the first array of neural networks; and
selecting the portion of the first array of neural networks based on the respective fitness score of each neural network of the first array of neural networks.

4. The computer-implemented method of claim 1 further comprising:
calculating a respective fitness score for each neural network of the second array of neural networks; and
selecting a portion of neural networks of the second array based on the respective fitness score of each neural network of the second array of neural networks.

5. The computer-implemented method of claim 1, wherein mutating each neural network of the portion of the first array of neural networks comprises modifying a respective activation function of each neural network from a first type of activation function to a second type of activation function.

6. The computer-implemented method of claim 1, wherein the child neural network comprises a node from the mutated neural network of the portion of the first array of neural networks and a node from the neural network of the second array of neural networks.

7. A system comprising: a memory having computer readable instructions; and one or more processors for executing the computer readable instructions, the computer readable instructions controlling the one or more processors to perform operations comprising: mutating each neural network of a portion of a first array of neural networks, wherein each neural network of the first array of neural networks is configured to select a respective sequence of test cases for testing a computing infrastructure, wherein unique innovation numbers are used to track changes to each neural network of the portion of the first array of neural networks resulting from the mutating; causing each neural network of a second array of neural networks to select a respective sequence of test cases for testing the computing infrastructure; and generating a child neural network by performing a crossover operation between a mutated neural network of the portion of the first array of neural networks and a neural network of the second array of neural networks using the unique innovation numbers associated with the mutated neural network of the portion of the first array of neural networks, the child neural network generating a new sequence of test cases for testing the computing infrastructure, wherein each neural network of the first array of neural networks belongs to a first class of neural network having a first neural network architecture type and each neural network of the second array belongs to a second class of neural network having a second neural network architecture type, and wherein the second neural network architecture type differs in topology from the first neural network architecture type as to the functioning of node layers and connections between nodes of the neural networks, and wherein the first neural network architecture type is of a first type selected from a group consisting of a feedforward neural network, a radial bias network, a long/short term memory network, and a deep convolutional network, and wherein the second neural network architecture is of a second type selected from a group consisting of a feedforward neural network, a radial bias network, a long/short term memory network, and a deep convolutional network, that differs from the first type.

8. The system of claim 7, wherein the operations further comprise initializing each neural network of the first array of neutral networks by randomizing a portion of respective weights and biases associated with each neural network of the first array of neural networks.

9. The system of claim 7, wherein the operations further comprise:
calculating a respective fitness score for each neural network of the first array of neural networks; and
selecting the portion of the first array of neural networks based on the respective fitness score of each neural network of the first array of neural networks.

10. The system of claim 7, wherein the operations further comprise:
calculating a respective fitness score for each neural network of the second array of neural networks; and
selecting a portion of neural networks of the second array based on the respective fitness score of each neural network of the second array of neural networks.

11. The system of claim 7, wherein mutating each neural network of the portion of the first array of neural networks comprises modifying a respective activation function of each neural network from a first type of activation function to a second type of activation function.

12. The system of claim 7, wherein the child neural network comprises a node from the mutated neural network of the portion of the first array of neural networks and a node from the neural network of the second array of neural networks.

13. A computer program product comprising a computer readable storage medium having program instructions embodied therewith, the program instructions executable by a processor to cause the processor to perform operations comprising: mutating each neural network of a portion of a first array of neural networks, wherein each neural network of the first array of neural networks is configured to select a respective sequence of test cases for testing a computing infrastructure, wherein unique innovation numbers are used to track changes to each neural network of the portion of the first array of neural networks resulting from the mutating; causing each neural network of a second array of neural networks to select a respective sequence of test cases for testing the computing infrastructure; and generating a child neural network by performing a crossover operation between a mutated neural network of the portion of the first array of neural networks and a neural network of the second array of neural networks using the unique innovation numbers associated with the mutated neural network of the portion of the first array of neural networks, the child neural network generating a new sequence of test cases for testing the computing infrastructure, wherein each neural network of the first array of neural networks belongs to a first class of neural network having a first neural network architecture type and each neural network of the second array belongs to a second class of neural network having a second neural network architecture type, and wherein the second neural network architecture type differs in topology from the first neural network architecture type as to the functioning of node layers and connections between nodes of the neural networks, and wherein the first neural network architecture type is of a first type selected from a group consisting of a feedforward neural network, a radial bias network, a long/short term memory network, and a deep convolutional network, and wherein the second neural network architecture is of a second type selected from a group consisting of a feedforward neural network, a radial bias network, a long/short term memory network, and a deep convolutional network, that differs from the first type.

14. The computer program product of claim 13, wherein the operations further comprise initializing each neural network of the first array of neutral networks by randomizing a portion of respective weights and biases associated with each neural network of the first array of neural networks.

15. The computer program product of claim 13, wherein the operations further comprise:
   calculating a respective fitness score for each neural network of the first array of neural networks; and
   selecting the portion of the first array of neural networks based on the respective fitness score of each neural network of the first array of neural networks.

16. The computer program product of claim 13, wherein the operations further comprise:
   calculating a respective fitness score for each neural network of the second array of neural networks; and
   selecting a portion of neural networks of the second array based on the respective fitness score of each neural network of the second array of neural networks.

17. The computer program product of claim 13, wherein mutating each neural network of the portion of the first array of neural networks comprises modifying a respective activation function of each neural network from a first type of activation function to a second type of activation function.

\* \* \* \* \*